Jan. 22, 1946.  W. C. TRAUTMAN  2,393,489

FLUID COUPLING

Filed Aug. 26, 1944

INVENTOR.
W. C. TRAUTMAN
BY Ell Woodbury
ATTORNEY

Patented Jan. 22, 1946

2,393,489

UNITED STATES PATENT OFFICE 2,393,489

FLUID COUPLING

Walter C. Trautman, Los Angeles, Calif., assignor to Bendix Aviation Corporation, South Bend, Ind., a corporation of Delaware Application August 26, 1944, Serial No. 551,367

4 Claims. (Cl. 284—19)

This invention relates to quick detachable couplings for making and breaking connection between two fluid lines and has to do more particularly with that type of coupling having automatically actuated valves for closing the end of each line when the connection is broken.

An object of the invention is to provide a simple and practical coupling that can be connected without introducing air into the lines and can be broken without losing fluid from the lines.

Another object is to provide a coupling of such construction that connection can be easily and quickly made and broken.

Another object is to provide a coupling of such construction that connection can be made and broken by relative rotation between the parts through a small angle and without introduction of air into, or loss of fluid from, the lines.

Still another object is to provide a coupling that satisfies the foregoing objects and in addition, is simple, reliable, and inexpensive to manufacture.

Other more specific objects and features of the invention will become apparent from the detailed description to follow.

It is highly desirable to be able to make and break connection in the fluid lines of hydraulic systems and the like while the lines contain fluid under pressure. As a result, many couplings have been devised which incorporate valves in the two separable elements of the coupling for automatically closing off each line when the connection is broken, the arrangement being such that the valves are opened to permit fluid flow through the coupling in response to union of the separable elements. A common defect of most such prior couplings is that when the two coupling elements are brought together into sealing engagement with each other, but before the coupling mechanism has been fully actuated to open the valves, there is a gap, or space, between the coupling elements. The result is that, at the time connection is made, this gap, or space, contains air, which is then introduced into the line when the valves are opened. Likewise, when the connection is broken, some line fluid is left in the gap after the valves have closed, and this fluid is lost when the connection is broken. Some couplings have been devised that eliminate the gap between the coupling members but such devices are relatively complicated and difficult to manipulate.

Briefly, the present invention comprises a coupling having two members adapted to be moved into abutting, sealing, relation with each other and locked together by relative rotation through a fraction of a revolution, in combination with valve elements, one in each coupling member, adapted to normally close the passages in the couplings but having cam elements on their outer ends which interengage with each other and function to open the valves in response to the relative rotation which locks the member together. The ends of the coupling members and the cams are complementary to each other so that they engage over their entire surfaces when the members are brought into abutment, to eliminate all space in which air or fluid could be trapped.

The invention will now be fully explained by describing in detail a specific embodiment thereof as disclosed in the drawing in which.

Figure 1:
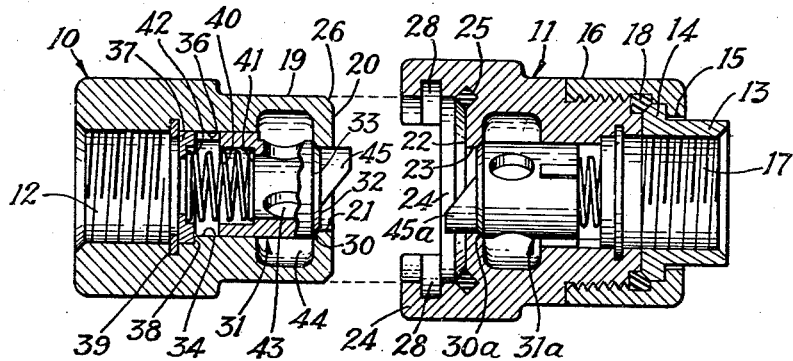
Fig. 1 is a longitudinal section showing the two members of the coupling in separated relation.

Referring to Fig. 1, my coupling comprises a pair of cooperating coupling elements 10 and 11, respectively, which are adapted to be connected to separate fluid lines, and which connect to each other to complete fluid connection between their associated lines.

The members 10 and 11 are identical in all respects except that the member 10 is a male member whereas the member 11 is a female member, and the member 10 is provided with internal threads 12 for direct connection to an associated threaded pipe, whereas the member 11 is shown provided with a swivel connector element 13 having an outwardly projecting flange 14 adapted to be engaged by an inwardly extending flange 15 on an internally threaded sleeve 16 adapted to be screwed on to the rear end of the member 11. The coupling element 13 is internally threaded as indicated at 17 for attachment to its associated pipe. A gasket 18 is provided to effect a seal between the element 17 and the body 11.

Figure 2:
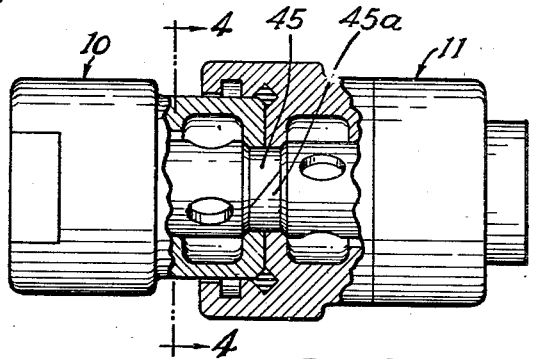
Fig. 2 is a view partly in section and partly in elevation showing the two coupling members brought together in abutting sealing relation but in the same positions of rotation as in Fig. 1.

The body 10 of the male member has a cylindrical forward section 19 terminating in a flat end surface 20 containing a fluid orifice 21. The female member 11 is provided with an end face 22 containing a fluid orifice 23. Surrounding and extending forwardly from the end face 22, is a short, annular rim portion 24 adapted to guidingly receive the end of the cylindrical part 19 of the male member 10, and a gasket 25 is positioned in an annular groove located between the end face 22 and the annular rim 24, for sealing against a chamfered edge 26 on the male member 10 when the parts are brought together, as shown in Fig. 2.

Figure 4:
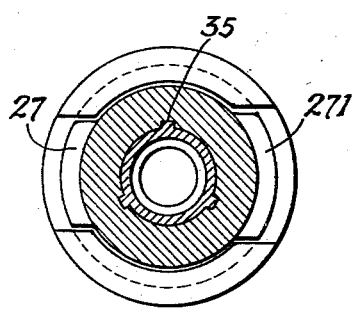
Fig. 4 is a cross section taken in the plane 4—4 of Fig. 2.
Figure 5:
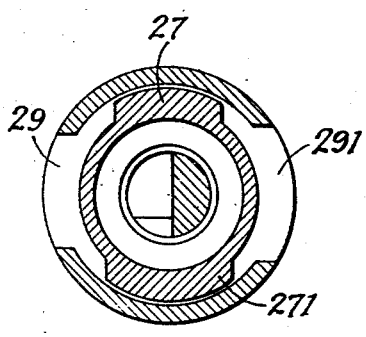
Fig. 5 is a cross section in the plane 5—5 of Fig. 3.

To lock the members 10 and 11 together, a pair of diametrically opposite arcuate flanges 27 and 271 (Fig. 4) are provided on the cylindrical portion 19 of the male member, which flanges cooperate with a pair of annular internal grooves 28 in the rim 24 of the female member, two diametrically opposite sections of the rim 24 being cut away to provide unequal notches 29 and 291 (Fig. 5) for the passage of the flanges 27 and 271 when the two members are moved into abutting relation, after which the members are rotated 90° with respect to each other to carry the flanges 27 and 271 into the grooves 28. The flange 27 and the notch 29 are shorter, circumferentially, than the flange 271 and the notch 291, to make it impossible to join the members 10 and 11 except in one position.

The valve structures in the two members 10 and 11 are identical and the valve elements of member 11 bear the same reference numeral as the corresponding elements in member 10 with the suffix a. Thus, the inner ends of the orifice 21 of member 10 and the orifice 23 of member 11 are chamfered to constitute valve seats 30 and 30a respectively.

Referring now to member 10a, hollow poppet 31 is provided having a solid end wall 32, the outer edge of which is chamfered to provide a conical surface 33 normally seating against seat 30 and closing the orifice 21. The poppet has a cylindrical side wall longitudinally slidable in a cylindrical surface 34 provided within the body 10. To prevent rotation of the poppet within the member 10, the poppet is shown provided with a plurality of longitudinal lands 35 which engages grooves 36 in the cylindrical surface 34, but it is to be understood that other structures may be used to prevent rotation, such as by making the poppet wall 33 and body surface 34 non-circular in cross section. Rearward movement of the poppet 31 is limited by a washer 37, which is retained in position between a shoulder 38 at the left end of the cylindrical surface 34, and a snap ring 39 in a groove provided therefor in the member 10. The poppet is yieldably urged outwardly into seating position, as shown in Fig. 1, by a helical spring 40 compressed between a shoulder 41 on the inner surface of the poppet and a shoulder 42 on the washer 37. A plurality of apertures 43 are provided in the side wall of the poppet immediately back of the seating surface 33, to permit fluid flow when the valve is in open position, these apertures 43 communicating with an annular space 44 within the body 10 immediately back of the seat 30.

As has been previously stated, the two poppets 31 and 31a are identical and each has on its front end wall 32, and preferably formed integrally therewith, a cam member 45 or 45a, which cam members are complementary in shape so that when the two coupling members are moved into abutting relation, as shown in Fig. 2, there is no free space left between them within the annular sealing ring 25. Thus, it will be observed from inspection of Fig. 2 that the end wall 20 of the member 10 fits flush against the end wall 22 of the member 11, and the end surfaces of the poppet 31 fit against the end surface of the poppet 31a. It will also be observed that in the position shown in Fig. 2, in which the two coupling members have been moved together but not turned, both poppets are still seated so that no fluid can escape from either line.

Figure 3:
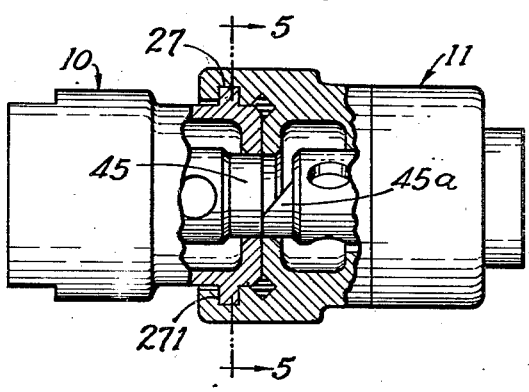
Fig. 3 is a view similar to Fig. 2, but showing the left coupling member rotated 90° from the position shown in Fig. 2.

As previously indicated, connection is completed after moving the poppets together as shown in Fig. 2, by relatively rotating the two parts through 90°. As shown in Fig. 3, the member 10 has been rotated through 90° relative to its position in Fig. 2, whereas the member 11 is shown in the same position of rotation. Oftentimes the members 10 and 11 are connected to the ends of flexible hoses, under which condition either or both members may be rotated to complete the connection. If the members are connected to rigid pipes, or tubes that should not be twisted, then the member 11 can be rotated by virtue of its swivel element 13.

When the members 10 and 11 are rotated to lock them together, the poppets 31 and 31a are similarly rotated, because of the lands and grooves 35 and 36, and 35a and 36a, and relative rotation of the poppets causes the cams 45 and 45a to ride up on each other to open both poppets, as shown in Fig. 3 so that fluid can flow from one line to the other. Thus, the fluid flow may be traced from left to right first into the hollow poppet 31, out through the apertures 43 into the annular space 44, thence past the seat 30 and through the orifice 21 to the orifice 23, past the seat 30a, into the annular space 44a, and thence through the apertures 43a into the hollow poppet 31a, and out of the rear end of the latter into the line connected to the member 11.

One of the poppets 31 or 31a may open before the other due to slight unequalities between springs 40 and 40a respectively, but when the relative rotation between the members has been completed, both poppets will be opened, because the stop washers 37 and 37a limit the individual movement of each poppet to a value equal to approximately half the total movement produced by the cams 45.

When the connection is to be broken, the procedure is reversed, the members 10 and 11 being first relatively rotated (in either direction) through 90° to bring the parts into the position shown in Fig. 2, after which they are pulled directly apart. Rotation of the parts back into the position shown in Fig. 2 restores the cams 45 and 45a into nesting relation with each other so that all line fluid that was within the orifices 21 and 23 is forced back past the valve seats, as the poppets close on the seats. Hence, no fluid is lost when the connection is broken.

It may sometimes be desirable to provide a slight helical pitch on the flanges 27 and 271 or the grooves 28 so that rotation between the parts to interlock them together tightens the face 20 against the face 22.

Although for the purpose of explaining the invention a specific embodiment thereof has been disclosed and described in detail, various departures from the exact construction shown can be made without departing from the invention, which is to be limited only to the extent set forth in the appended claims.

I claim:

1. In a coupling of the type described: a pair of fluid-conducting members having fluid passages therethrough and having cooperating annular surfaces adapted to contact each other and effect an annular fluid seal between said members when they are in abutment with each other, said members being relatively rotatable between first and second positions respectively while maintaining said annular fluid seal; valve means in each member normally closing the fluid passage therein; cam means associated with each member and cooperating with the cam means of the other member to open both valve means in response to relative rotation between said members from said first to said second positions while said members are in abutment; and means for locking said members together in abutment in said second position of relative rotation; said two members and their associated cam means having complementary abutting surfaces fitting together over their entire areas within said annular fluid seal when said members are in abutment in said first position of relative rotation, whereby there is no space for the trapping of fluid between said members.

2. In a coupling of the type described: a pair of fluid-conducting members having fluid passages therethrough and having cooperating annular surfaces adapted to contact each other and effect an annular fluid seal between the members when they are in abutment with each other, said members being relatively rotatable between first and second positions respectively while maintaining said annular fluid seal, and having juxtaposed, circular fluid passages in their abutting ends and valve seats at the inner ends of said passages; a valve element longitudinally movable within each member and having an annular seating surface adapted to seat on the valve seat of its associated member when the valve element is in forward position, said valve elements having on their forward ends complementary cam structures each cooperating with the other valve element and its cam structure to completely fill the space defined within said annular sealing surfaces and between the valve seats of the two members when said two members are in abutment and in said first position of relative rotation; means for locking said members together in abutment in said second position of relative rotation; and means restraining relative rotation of each valve element with respect to its associated member while permitting longitudinal movement thereof toward and away from its seat, whereby said two cam structures are relatively rotated in response to rotation of said members from said first to said second positions, said cam structures cooperating to cam themselves apart longitudinally in response to relative rotation therebetween.

3. In a coupling of the type described: a pair of fluid-conducting members having fluid passages therethrough and having cooperating annular surfaces adapted to contact each other and effect an annular fluid seal between said members when they are in abutment with each other, said members being relatively rotatable between first and second positions respectively while maintaining said annular fluid seal; longitudinally movable valve means in each member normally closing the fluid passage therein; cam means associated with each member and cooperating with the cam means of the other member to open both valve means in response to relative rotation between said members from said first to said second positions while said members are in abutment; and means for locking said members together in abutment in said second position of relative rotation; said two members and their associated cam means having complementary abutting surfaces fitting together over their entire areas within said annular fluid seal when said members are in said first position of relative rotation and in abutment, whereby there is no space for the trapping of fluid between said members; and means limiting longitudinal opening movement of each valve means to a distance less than the total relative movement between the two valves produced by rotating said members from said first to said second position.

4. In a coupling of the type described: a pair of fluid-conducting members adapted to be connected by placing them in abutting relation and relatively rotating them and having cooperating annular sealing surfaces effecting a seal therebetween in all positions of rotation, each member having an end wall lying against the end wall of the other member when said members are in said abutting relation, said end walls having registering cylindrical openings therein and the inner ends of the openings constituting valve seats; a poppet valve in each member seating against the seat in that member in an outer position and movable away from the seat to an inner position, said poppet valves having complementary cams thereon which project through said cylindrical openings and seat against each other and against the walls of said openings to substantially fill the space within said cylindrical openings when said members are in said abutting relation and in a first position of relative rotation; means supporting each valve for longitudinal movement relative to and rotary movement with its associated member; spring means urging each valve into its said outer position; and means for locking said members together in response to relative rotation therebetween from said first position into a second position; said complementary cams being so shaped as to move said valves apart into their said inner positions in response to relative rotation of said members from said first position to said second position.

WALTER C. TRAUTMAN.